United States Patent
Parundekar

(10) Patent No.: US 9,688,281 B2
(45) Date of Patent: Jun. 27, 2017

(54) PROACTIVE AUTOCOMPLETE OF A USER'S IN-VEHICLE OPERATIONS

(71) Applicant: TOYOTA JIDOSHA KABUSHIKI KAISHA, Toyota-shi, Aichi-ken (JP)

(72) Inventor: Rahul Parundekar, Sunnyvale, CA (US)

(*) Notice: Subject to any disclaimer, the term of this patent is extended or adjusted under 35 U.S.C. 154(b) by 67 days.

(21) Appl. No.: 14/665,685

(22) Filed: Mar. 23, 2015

(65) Prior Publication Data

US 2016/0280220 A1  Sep. 29, 2016

(51) Int. Cl.

| | |
|---|---|
| B60W 40/08 | (2012.01) |
| B60W 50/00 | (2006.01) |
| B60W 50/10 | (2012.01) |
| B60S 1/08 | (2006.01) |
| B60Q 1/14 | (2006.01) |

(52) U.S. Cl.
CPC ............. *B60W 40/08* (2013.01); *B60Q 1/143* (2013.01); *B60S 1/0818* (2013.01); *B60W 50/0098* (2013.01); *B60W 50/10* (2013.01); *B60Q 2300/312* (2013.01); *B60W 2550/12* (2013.01); *B60W 2550/20* (2013.01)

(58) Field of Classification Search
None
See application file for complete search history.

(56) References Cited

U.S. PATENT DOCUMENTS

| | | | |
|---|---|---|---|
| 5,408,587 A | 4/1995 | Maier et al. | |
| 5,519,257 A * | 5/1996 | Lock, III | B60Q 1/143 |
| | | | 307/10.8 |
| 6,254,259 B1 * | 7/2001 | Kobayashi | B60Q 1/085 |
| | | | 340/459 |
| 6,587,573 B1 * | 7/2003 | Stam | B60Q 1/085 |
| | | | 340/930 |
| 6,631,361 B1 | 10/2003 | O'Flaherty et al. | |
| 7,346,409 B2 | 3/2008 | Nakajima et al. | |
| 8,423,362 B2 | 4/2013 | Chengalvarayan et al. | |
| 8,781,716 B1 * | 7/2014 | Wenneman | G01C 21/3484 |
| | | | 701/118 |
| 9,376,117 B1 * | 6/2016 | Parundekar | B60W 50/08 |
| 2006/0108932 A1 * | 5/2006 | Yamazaki | B60Q 1/143 |
| | | | 315/82 |

(Continued)

FOREIGN PATENT DOCUMENTS

| | | | | |
|---|---|---|---|---|
| GB | WO 2016005289 A1 * | 1/2016 | ........ | B60W 50/0098 |
| JP | 2009121960 A | 6/2009 | | |

(Continued)

*Primary Examiner* — Rami Khatib
*Assistant Examiner* — Jeffrey Boomer
(74) *Attorney, Agent, or Firm* — Burbage Law, P.C.; Elizabeth Ruzich; Jon-Michael Burbage

(57) ABSTRACT

The disclosure includes a method for autocompleting an in-vehicle operation that includes monitoring sensors for sensor data. The method includes determining an occurrence of an initial vehicle operation performed by a user based on the sensor data. The method includes determining a vehicle task from a digitally stored dataset based on the initial vehicle operation. The method includes determining a next vehicle operation to autocomplete based on the vehicle task. The method includes autocompleting the next vehicle operation. The method includes determining whether the vehicle task is complete.

21 Claims, 4 Drawing Sheets

(56) References Cited

U.S. PATENT DOCUMENTS

| | | | | |
|---|---|---|---|---|
| 2006/0175859 | A1* | 8/2006 | Isaac | B60J 3/04 296/97.4 |
| 2007/0052555 | A1* | 3/2007 | Ibrahim | B60Q 1/12 340/990 |
| 2007/0182532 | A1* | 8/2007 | Lengning | G10H 1/0041 340/439 |
| 2009/0164216 | A1* | 6/2009 | Chengalvarayan | B60R 16/0373 704/251 |
| 2009/0200947 | A1* | 8/2009 | Sasa | B60Q 1/085 315/80 |
| 2010/0152997 | A1* | 6/2010 | de Silva | G01C 21/26 701/532 |
| 2010/0181171 | A1* | 7/2010 | Kawachi | B60Q 1/1476 200/16 R |
| 2011/0018441 | A1* | 1/2011 | Tanaka | B60Q 1/0094 315/82 |
| 2012/0062116 | A1* | 3/2012 | Kracker | B60Q 1/143 315/82 |
| 2013/0090751 | A1* | 4/2013 | Harber | H03G 3/3089 700/94 |
| 2014/0136013 | A1* | 5/2014 | Wolverton | B60K 35/00 701/1 |
| 2014/0306799 | A1* | 10/2014 | Ricci | B60Q 1/00 340/5.83 |
| 2015/0006457 | A1 | 1/2015 | Lambert et al. | |
| 2015/0189241 | A1* | 7/2015 | Kim | H04N 7/181 348/148 |
| 2015/0191178 | A1* | 7/2015 | Roy | B60W 40/09 701/36 |
| 2015/0199616 | A1* | 7/2015 | Rajendraprasad | G06F 9/44505 706/12 |
| 2015/0360567 | A1* | 12/2015 | Sannomiya | G06F 3/04883 345/174 |

FOREIGN PATENT DOCUMENTS

| | | | | |
|---|---|---|---|---|
| WO | | 03083794 A1 | 10/2003 | |
| WO | WO 2014051806 A1 | * | 4/2014 | ........... G01C 21/343 |

* cited by examiner

US 9,688,281 B2

PROACTIVE AUTOCOMPLETE OF A USER'S IN-VEHICLE OPERATIONS

CROSS REFERENCE TO RELATED APPLICATIONS

This application is related to U.S. patent application Ser. No. 14/665,598, filed Mar. 23, 2015 and titled "Driver Familiarity Adapted Explanations for Proactive Automated Vehicle Operations," the entirety of which is herein incorporated by reference.

BACKGROUND

The specification relates to proactive autocomplete of a user's in-vehicle operations.

Drivers have to complete a large number of operations in their vehicles. For example, when a driver gets into a car, the driver may turn the car on, set the stereo to a specific station, turn on heated seating, and adjust the angle of the seat if someone else previously used the car. Completing these operations may distract the driver and risk the driver's safety if the driver is completing the operations while driving. In addition, the driver may be annoyed by the number of operations that need to be completed.

Current automation systems provide single operation automated functions. For example, vehicles may include an automation system that activates the vehicle's headlights when it is dark outside. However, these automation systems are limited in their usefulness because they fail to address the large number of operations that need to be completed.

SUMMARY

According to one innovative aspect of the subject matter described in this disclosure, a method includes monitoring sensors for sensor data, determining an occurrence of an initial vehicle operation performed by a user based on the sensor data, determining a vehicle task from a digitally stored dataset based on the initial vehicle operation, determining a next vehicle operation to autocomplete based on the vehicle task, autocompleting the next vehicle operation, and determining whether the vehicle task is complete.

These and other implementations may each optionally include one or more of the following operations and features. For instance, the operations further include: responsive to the vehicle task failing to be complete, determining an additional vehicle operation to autocomplete based on the vehicle task, autocompleting the additional vehicle operation, and repeating until the vehicle task is complete; determining a confidence factor that indicates a likelihood that the initial vehicle operation performed by the user was properly determined and where determining the vehicle task is also based on the confidence factor exceeding a threshold value; determining a confidence factor that indicates a likelihood that the vehicle task was properly determined from the digitally stored dataset and the initial vehicle operation and where determining the next vehicle operation is also based on the confidence factor exceeding a threshold value; receiving weather data or traffic data from a network and determining a next vehicle task based on the weather data or the traffic data; determining an occurrence of a subsequent vehicle operation performed by a user in response to performing the vehicle task and updating the digitally stored dataset by adding the subsequent vehicle operation to the vehicle task as an additional operation to be autocompleted; responsive to autocompleting the next vehicle operation, monitoring in-vehicle sensors for sensor data that includes images and sounds of a user and generating a familiarity estimate that indicates whether the user is familiar with the next vehicle operation based on the sensor data; and monitoring a sequence of vehicle operations performed by a user to complete the vehicle task and generating the digitally stored dataset by adding the vehicle task with the sequence of vehicle operations performed by the user.

For instance, the features include: where the sensors include in-vehicle sensors that are used to determine the occurrence of the initial vehicle operation performed by the user; where the sensors detect an environmental condition and the vehicle task is based on the environmental condition; where the digitally stored dataset is a digitally stored table that includes a list of sensors to be monitored for the vehicle task; and where responsive to the familiarity estimate failing to exceed a threshold value, generating an explanation of the next vehicle operation for the user.

In general, another innovative aspect of the subject matter described in this disclosure may be embodied in methods that include monitoring sensors for sensor data, determining an occurrence of an initial vehicle operation performed by a user based on the sensor data, determining a vehicle task from a digitally stored table based on the initial vehicle operation performed by the user, determining a next vehicle operation to autocomplete based on the vehicle task, autocompleting the next vehicle operation, determining whether the vehicle task is complete, and responsive to the vehicle task failing to be complete, determining an additional vehicle operation to autocomplete based on the vehicle task, autocompleting the additional vehicle operation, and repeating until the vehicle task is complete.

The disclosure is particularly advantageous in a number of respects. For example, the method includes proactively autocompleting multiple vehicle operations that correspond to a vehicle task. The method autocompletes in-vehicle operations based on a user performing an initial operation, determining an environmental change, or receiving weather data or traffic data. The method may also modify the vehicle operations associated with the vehicle task based on feedback from the user. Lastly, the method can determine whether the user is familiar with autocompleted vehicle operations and, if not, the method can generate an explanation for the user.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

Figure 1:
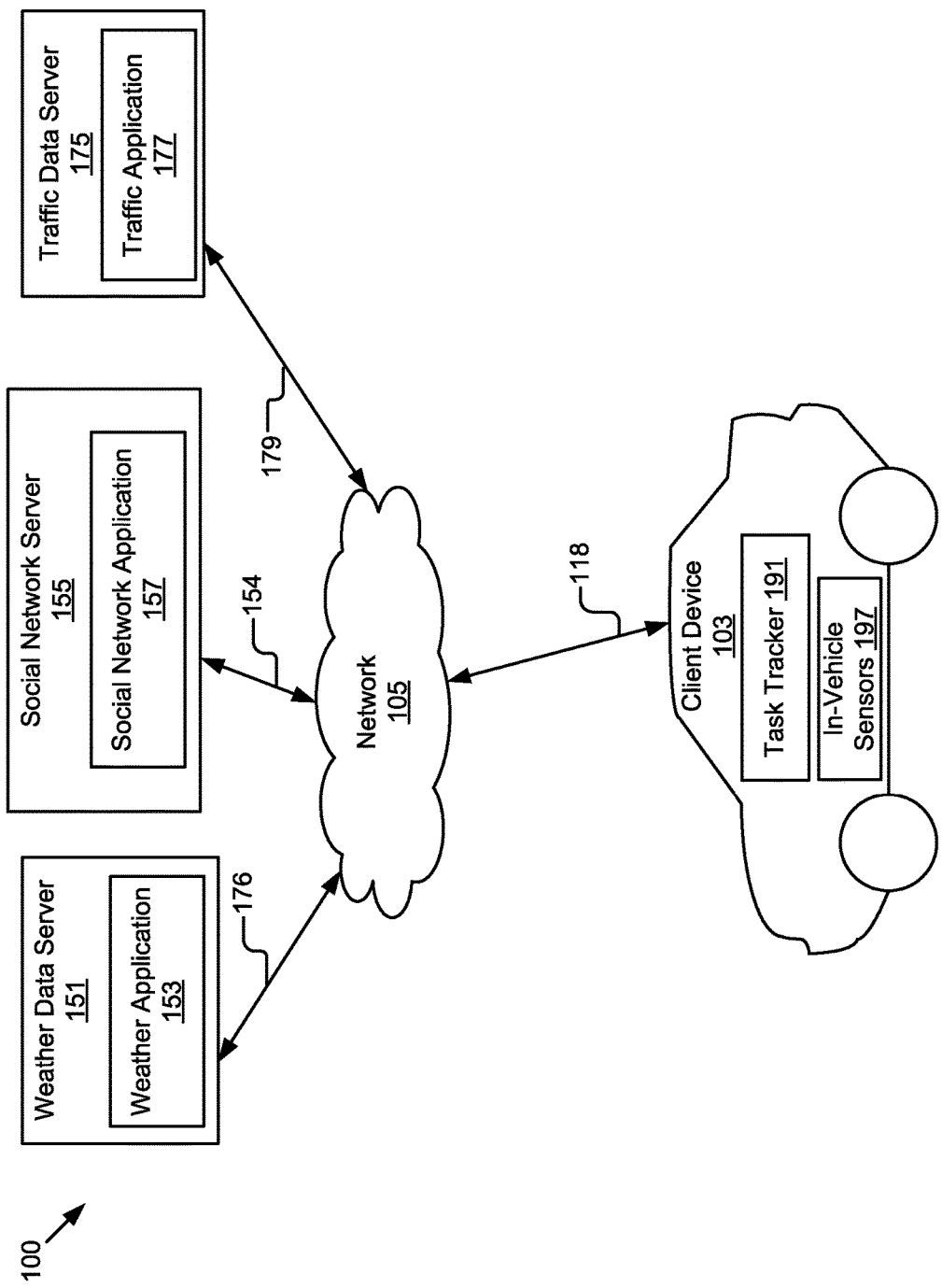
FIG. 1 is a block diagram illustrating an example system for proactively autocompleting a user's in-vehicle operation.

The task tracker system described herein may include a computing device. For example, the task tracker system may include a personal computer, laptop, tablet computer, server, or any processor-based computing device including server software. Alternatively, the task tracker system may be included in an embedded system of a vehicle. An onboard computer of the vehicle may include one or more electronic devices that are configured to store and execute the task tracker system. The task tracker system may be stored in a tangible memory of the onboard computer and executed by a processor of the onboard computer. The task tracker system may be communicatively coupled to a network for bidirectional wireless communication with one or more servers.

The task tracker system may include a memory and a processor device. The processor device may be programmed to perform one or more steps of a method 400 described below with reference to FIG. 4. One or more example implementations of the task tracker system will be described below.

The task tracker system may monitor sensors for sensor data. The sensors may include in-vehicle sensors that detect an initial vehicle operation performed by a user. For example, the windshield wipers may detect that the user initiated operation of the windshield wipers. In another example, the sensors may include in-vehicle cameras and the sensor data may include images captured by the in-vehicle cameras. In yet another example, the sensors may include a communication unit that receives wireless updates of weather data or traffic data from a network, for example, from the Internet.

In some implementations, the task tracker system determines an occurrence of an initial vehicle operation performed by a user based on the sensor data. For example, the initial vehicle operation may include that the user turned on the windshield wipers. The task tracker system determines a vehicle task from a digitally stored dataset based on the initial vehicle operation. For example, the task tracker may determine that turning on the windshield wipers is a first operation from a sequence of vehicle operations for the vehicle task of "preparing a vehicle for driving in the rain." This vehicle task may include one or more vehicle operations. The task tracker system determines a next vehicle operation to autocomplete based on the vehicle task. For example, the task tracker may determine that the next vehicle operation for preparing the vehicle for driving in the rain is to turn on the headlights. The task tracker system instructs hardware associated with the vehicle to perform the next vehicle operation.

Once the task tracker system has determined a next vehicle operation to autocomplete based on the vehicle task, the task tracker system autocompletes the next vehicle operation. The task tracker system determines if the vehicle task is complete. If the vehicle task is not complete, the task tracker system may determine the next vehicle operation to autocomplete and repeat the steps of autocompleting the next vehicle operation and determining whether the vehicle task is complete until the vehicle task is complete. For example, the task tracker system may determine that the initial vehicle operation is that the user turned on the windshield wipers, the vehicle task is to prepare the vehicle for driving in the rain, and the next vehicle operation is to turn on the headlights. The task tracker system may turn on the headlights and determine whether the vehicle task is complete. The task tracker system may determine that the vehicle task is not complete because the digitally stored dataset includes an instruction to turn on the back windshield wipers. The task tracker system may turn on the back windshield wipers and determine that the vehicle task is complete.

System Overview

FIG. 1 illustrates a block diagram of one embodiment of a task tracker system 100 for proactively autocompleting a user's in-vehicle operation. The task tracker system 100 includes a client device 103, a weather data server 151, a social network server 155, and a traffic data server 175. In the illustrated embodiment, these entities of the task tracker system 100 may be communicatively coupled via a network 105. The task tracker system 100 may include other servers or devices not shown in FIG. 1 including, for example, a power service server for providing power usage service (e.g., a billing service) and a map server for providing map data.

The client device 103 can be used by way of example. While FIG. 1 illustrates one client device 103, the disclosure applies to a system architecture having one or more client devices 103. Furthermore, although FIG. 1 illustrates one network 105 coupled to the client device 103, the weather data server 151, the social network server 155, and the traffic data server 175, in practice one or more networks 105 can be connected to these entities. While FIG. 1 includes one weather data server 151, one social network server 155, and one traffic data server 175, the task tracker system 100 could include one or more weather data servers 151, one or more social network servers 155, and one or more traffic data servers 175.

The network 105 can be a conventional type, wired or wireless, and may have numerous different configurations including a star configuration, token ring configuration, or other configurations. Furthermore, the network 105 may include a local area network (LAN), a wide area network (WAN) (e.g., the Internet), or other interconnected data paths across which multiple devices may communicate. In some implementations, the network 105 may be a peer-to-peer network. The network 105 may also be coupled to or include portions of a telecommunications network for sending data in a variety of different communication protocols. In some implementations, the network 105 includes Bluetooth® communication networks or a cellular communications network for sending and receiving data including via short messaging service (SMS), multimedia messaging service (MMS), hypertext transfer protocol (HTTP), direct data connection, WAP, e-mail, etc. In some implementations, the network 105 may include a GPS satellite for providing GPS navigation to the client device 103. In some implementations, the network 105 may include a GPS satellite for providing GPS navigation to the client device 103. The network 105 may be a mobile data network such as 3G, 4G, LTE, Voice-over-LTE ("VoLTE"), or any other mobile data network or combination of mobile data networks.

The weather data server 151 can be a hardware server that includes a processor, a memory, and network communication capabilities. In the illustrated embodiment, the weather data server 151 is coupled to the network 105 via a signal line 176. The weather data server 151 sends and receives data to and from other entities of the task tracker system 100 via the network 105. For example, the weather data server 151 may receive a request for weather data from the client device 103. The weather data server 151 transmits the requested data to the client device 103 over the network 105.

The weather data server 151 includes a weather application 153 for generating weather data. The weather data may include roadway weather conditions, current forecasts, future forecasts, historical weather, etc. The weather application 153 may generate weather data for a particular location. For example, the weather application 153 may receive a request for weather data from the client device 103 that specifies a route that the client device 103 is travelling, a zip code, a town, etc. The weather application 153 may determine a weather forecast for the particular location and transmit the weather data to the client device 103.

The social network server 155 can be a hardware server that includes a processor, a memory, and network communication capabilities. In the illustrated example, the social network server 155 is coupled to the network 105 via signal line 154. The social network server 155 sends and receives data to and from other entities of the task tracker system 100 via the network 105. For example, the social network server 155 may receive a request for social data from the client device 103. The social network server 155 transmits the requested data to the client device 103 over the network 105.

The social network server 155 includes a social network application 157. The social network application 157 may generate a social network. For example, the social network may include Facebook™, Google+™, LinkedIn™, Tinder™, or QQ™. A social network can include a type of social structure where the users may be connected by a common feature. The common feature may include relationships or connections, such as friendship, family, work, an interest, etc. The common features may be provided by one or more social networking systems including explicitly defined relationships and relationships implied by social connections with other online users, where the relationships form a social graph. In some examples, the social graph can reflect a mapping of these users and how they are related.

In some implementations, the social network application 157 generates a social network that may include social data that the client device 103 uses to determine a vehicle task. For example, a driver of the client device 103 may have a friend on the social network that provides an update about traffic that the social network application 157 transmits to the client device 103. In some implementations, the social network application 157 may generate social data that includes vehicle tasks and/or vehicle operations that the social network server 155 transmits to the client device 103. For example, the common feature that connects the users in the social network may be that the users all use the task tracker 191. In this example, the social network application 157 may use the social network to crowd source social data that includes a task initiation detection template, a task situation detection template, vehicle tasks, and/or vehicle operations.

The traffic data server 175 can be a hardware server that includes a processor, a memory, and network communication capabilities. In the illustrated embodiment, the traffic data server 175 is coupled to the network 105 via a signal line 179. The traffic data server 175 sends and receives data to and from other entities of the task tracker system 100 via the network 105. For example, the traffic data server 175 may receive a request for traffic data from the client device 103. The traffic data server 175 transmits the requested data to the client device 103 over the network 105.

The traffic data server 175 may include a traffic application 177 for generating traffic data. For example, the traffic application 177 may generate traffic data that describes traffic conditions. The traffic application 177 may receive a request for traffic data along a route that the client device 103 is travelling. The client device 103 may request the traffic data once, periodically (e.g., every five minutes, every ten minutes, etc.), or in response to a change in the traffic conditions.

The client device 103 can be a mobile client device with a battery system. For example, the client device 103 can be one of a vehicle (e.g., an automobile, a bus), a bionic implant, or any other mobile system including non-transitory computer electronics and a battery system. In some implementations, the client device 103 may include a computing device that includes a memory and a processor. In the illustrated embodiment, the client device 103 is communicatively coupled to the network 105 via signal line 118.

The client device 103 includes a task tracker 191 and in-vehicle sensors 197. The task tracker 191 can be software for detecting objects in real-time images. In some implementations, the task tracker 191 can be implemented using hardware including a field-programmable gate array ("FPGA") or an application-specific integrated circuit ("ASIC"). In some other implementations, the task tracker 191 can be implemented using a combination of hardware and software. The task tracker 191 may be stored in a combination of the devices and servers, or in one of the devices or servers.

The task tracker 191 monitors sensors for sensor data, determines a vehicle task from a digitally stored dataset based on the sensor data, determines a next vehicle operation to autocomplete based on the vehicle task, and autocompletes the next vehicle operation.

In some implementations, the sensors include in-vehicle sensors 197 and the task tracker 191 determines an occurrence of an initial vehicle operation performed by a user based on the sensor data from the in-vehicle sensors 197. The task tracker 191 may directly determine the initial vehicle operation performed by the user, such as when a user presses a button on a stereo system.

Alternatively, the task tracker 191 may indirectly determine the initial vehicle operation performed by the user, such as by receiving images from an in-vehicle sensor 197 and determining whether the user's movement corresponds to pressing the button on the stereo system. The task tracker 191 may determine a confidence factor that indicates a likelihood that the initial vehicle operation performed by the user was properly determined. For example, the task tracker 191 may have difficulty discerning whether the user turned on the windshield wipers or turned on the windshield wiper spray when both functions are activated using the same switch. The task tracker 191 may determine the vehicle task based on the confidence factor exceeding a threshold value. For example, the task tracker 191 may set the threshold value at 50% and the confidence factor has to exceed 50% in order for the vehicle task to be determined.

In some implementations, the task tracker 191 may indirectly determine the next vehicle operation based on a confidence factor associated with a vehicle task. For example, the task tracker 191 may determine from an in-vehicle sensor 197 that the user turned up the heat inside the client device 103. The task tracker 191 may determine that the initial vehicle operation corresponds to a vehicle task for warming the interior of the client device 103. The task tracker 191 may determine a confidence factor that indicates a likelihood that the vehicle task was properly determined from the digitally stored dataset and the initial vehicle operation. For example, the task tracker 191 may determine that if the confidence factor exceeds a threshold value of 40%, the task tracker 191 performs a next vehicle operation that includes turning on heated seats.

The task tracker 191 may determine the occurrence of the initial vehicle operation performed by a user regardless of a parameter associated with the initial vehicle operation. For example, the task tracker 191 may determine that the user turned on the air conditioning regardless of whether the user sets the temperature to 80 degrees Fahrenheit or 75 degrees Fahrenheit. Similarly, the task tracker 191 may accommodate operation parameters and sensor parameters.

In some implementations, the task tracker 191 determines the vehicle task based on sensor data independent of the user. In some implementations, the task tracker 191 may monitor sensors for sensor data from exterior vehicle sensors. For example, the task tracker system determines from the sensor data that it is raining. The task tracker system determines the vehicle task based on the sensor data from the exterior vehicle sensors. For example, the task tracker 191 determines that the vehicle task is preparing the vehicle for driving in the rain. The task tracker 191 determines from a digitally stored dataset that a first operation is to turn on the windshield wipers and that a second vehicle operation is to turn on the headlights.

In some implementations, the task tracker 191 receives data from the network 105. For example, the task tracker 191 may receive weather data from the weather data server 151 or traffic data from the traffic data server 175 via the network 105 and uses the weather data or the traffic data to determine the vehicle task from the digitally stored dataset. For example, the task tracker 191 may receive traffic data indicating that the driving directions that are being displayed on a display in the client device 103 include a route that intersects a huge traffic jam. The task tracker 191 may determine that the vehicle task is to avoid a traffic jam. The task tracker 191 may determine that a first vehicle operation is automatically updating the driving directions to avoid the traffic jam and that a second vehicle operation is to retrieve a number for the driver's spouse from an address book and to call the number.

The task tracker 191 may provide an explanation of the vehicle operation to the user. For example, responsive to the task tracker 191 autocompleting a vehicle operation, the task tracker 191 may monitor in-vehicle sensors for sensor data that captures images, sounds, pressure, or other physical changes of a user. For example, the task tracker 191 may receive images of the user's face and may determine that the user frowned, the user's pupils dilated, the user spoke words, such as "okay," "what," or uttered expletives. The task tracker 191 may include a list of words that have a particular meaning. For example, "okay" may be a term taught to the user to use when the user is comfortable with the vehicle operation. In another example, the in-vehicle sensors 197 may sense that the user grips the steering wheel or starts sweating in response to the task tracker 191 autocompleting the vehicle operation.

The task tracker 191 generates a familiarity estimate that indicates whether the user is familiar with the next vehicle operation based on the sensor data. For example, the task tracker 191 may determine a familiarity estimate that indicates that the user understands the vehicle operation when the user says "okay." Conversely, the task tracker 191 may determine a familiarity estimate that indicates that the user is confused if the user says "What?" If the familiarity estimate fails to exceed a threshold value, the task tracker 191 may generate an explanation of the vehicle operation for the user.

The task tracker 191 may learn from a user that performs vehicle operations to determine vehicle tasks that are stored in a digitally stored dataset. Before the digitally stored dataset is created, the task tracker 191 may monitor a sequence of vehicle operations performed by the user to complete a vehicle task. The monitoring may include determining parameters associated with each operation and a count of the vehicle operations performed. For example, the user may start the car, move a car seat to a different position, and set the stereo to a particular radio station. The task tracker 191 may determine that these three vehicle operations are performed to complete an initial start vehicle task. The task tracker 191 may generate the digitally stored table by adding the vehicle task with the sequence of vehicle operations performed by the user and parameter values associated with the car seat position and the radio station.

The task tracker 191 may update the digitally stored table based on user feedback. For example, the task tracker 191 may determine an occurrence of a subsequent vehicle operation performed by a user in response to autocompleting the vehicle task. For example, in response to the task tracker 191 turning on the heated seats, the user may have a habit of turning down the heat. The task tracker 191 may update the digitally stored table by adding the subsequent vehicle operation to the vehicle task as an additional operation to be autocompleted. In some implementations, the task tracker 191 may add the subsequent vehicle operation based on a threshold number of time that the user performs the subsequent vehicle operation after the task tracker 191 autocompletes the other vehicle operations for the vehicle task. For example, the task tracker 191 may add turning down the heat as a subsequent vehicle operation to be performed for the vehicle task if the user turned down the heat at least five times after the task tracker 191 turned on the heated seats.

The task tracker 191 may modify a level of autocomplete. In some implementations, the task tracker 191 may generate a user interface that displays graphical elements for a user to modify the level of autocomplete. For example, the task tracker 191 may generate a user interface with a movable slide for selecting the level of autocomplete, radio buttons for selecting a level of autocomplete, a drop-down box with the level of autocomplete, etc. The level of autocomplete may include a range from no autocomplete to all autocomplete. No autocomplete may include all vehicle operations being performed manually by a user. All autocomplete may include no manual steps from the user such that the vehicle task is determined only from sensor data and not from the user performing an initial vehicle operation. Gradations in between no autocomplete and all autocomplete may include, for example, a user performing an initial vehicle operation and the task tracker 191 performing next vehicle operations associated with the vehicle task. Once a user selects the level of autocomplete, the task tracker 191 may update the digitally stored dataset to include the level of autocomplete.

Example Task Tracker

Figure 2:
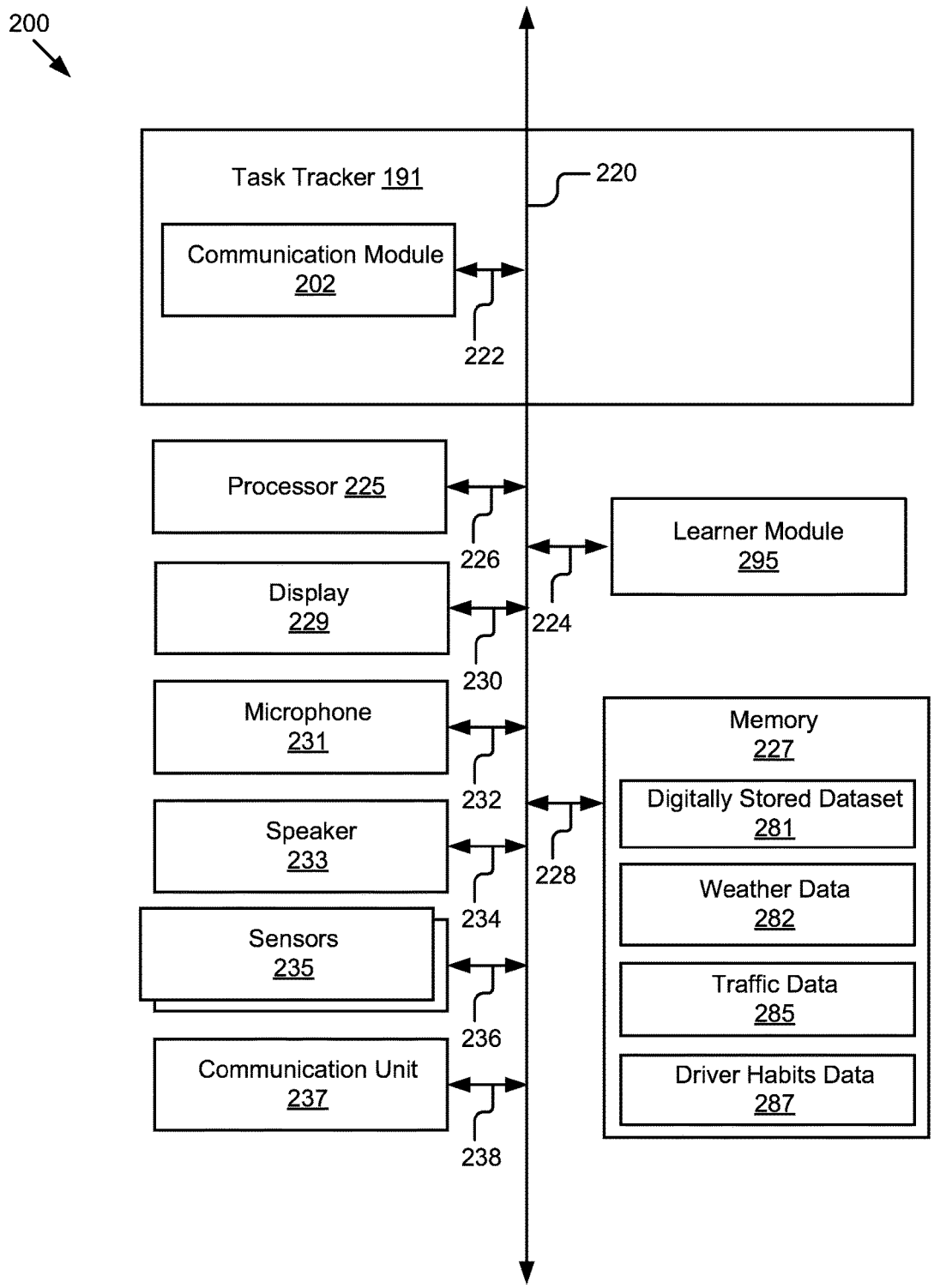
FIG. 2 is a block diagram illustrating an example task tracker device.

FIG. 2 is a block diagram illustrating an example task tracker device 200. The task tracker device 200 can be, include, or be included in the client device 103 of FIG. 1. FIG. 2 can include the task tracker 191, a learner module 295, a processor 225, a memory 227, a display 229, a microphone 231, a speaker 233, a sensor 235, and a communication unit 237. The components of the task tracker device 200 are communicatively coupled by a bus 220.

The processor 225 includes an arithmetic logic unit, a microprocessor, a general-purpose controller, or some other processor array to perform computations and provide electronic display signals to a display device. The processor 225 processes data signals and may include various computing architectures including a complex instruction set computer (CISC) architecture, a reduced instruction set computer (RISC) architecture, a graphic processor unit (GPU) architecture or an architecture implementing a combination of instruction sets. Although FIG. 2 includes a single processor 225, multiple processors 225 may be included. Other processors, operating systems, sensors, displays, and physical configurations may be possible. The processor 225 is coupled to the bus 220 for communication with the other components via signal line 226.

The memory 227 stores instructions or data that may be executed by the processor 225. The instructions or data may include code for performing the techniques described herein. The memory 227 may include a dynamic random access memory (DRAM) device, a static random access memory (SRAM) device, flash memory, or some other memory device. In some implementations, the memory 227 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis. The memory 227 is coupled to the bus 220 for communication with the other components via signal line 228.

As illustrated in FIG. 2, the memory 227 stores one or more of a digitally stored dataset 281, weather data 282, traffic data 285, and driver habits data 287.

The digitally stored dataset 281 includes a countable sequence of vehicle operations that are performed as a group in order to complete a vehicle task. The digitally stored dataset 281 describes different vehicle tasks and the vehicle operations that need to be autocompleted to complete each vehicle task. For each vehicle operation in the vehicle task, the digitally stored dataset 281 may contain a task initiation detection template that includes sensor values that suggest that the vehicle task is initiated. For example, if the user sets the windshield wipers to a low speed, the task tracker 191 may determine that the vehicle operation is to prepare the client device 103 of FIG. 1 to drive in the rain. In some implementations, the digitally stored dataset 281 includes a table that includes vehicle tasks and vehicle operations associated with each vehicle task.

Most vehicle tasks are associated with a subset of the available sensors 235 to be monitored to determine whether a vehicle task or a vehicle operation has been initiated or completed. As a result, the task situation detection template includes different sensors that are monitored for each task to reduce the number of sensors that are monitored. As a result, for each vehicle task, the task tracker 191 monitors the sensors 235 that are listed in the digitally stored dataset 281 as being associated with the vehicle task.

The digitally stored dataset 281 may include a task situation detection template for instances where the vehicle operation is performed based on sensor data. The task situation detection template may describe when the user is likely to perform the vehicle tasks and, if the sensor data indicates that the situation is occurring, the task tracker performs two or more vehicle tasks.

In some implementations, the digitally stored dataset 281 includes sensor data organized into blocks of the memory 227 designated as temporally separated. For each temporally separated memory block, the task tracker 191 detects the performance of a vehicle operation that denotes the user performing the vehicle operation based on data describing a connection between which vehicle operations use which sensors. Alternatively, the task tracker 191 may use the task situation detection template to detect a trigger for determining an occurrence of an initial vehicle operation. For a sequence of vehicle operations (including no operation) performed over the different temporally separated memory blocks, the task tracker 191 may identify from a digitally stored list of tasks a vehicle task that denotes that the user has performed the task using predefined data that includes a sequence of vehicle operations that are common or expected for that particular vehicle task.

The weather data 282 includes information about the weather. For example, the weather data may include roadway weather conditions (e.g., patches of black ice), current forecasts (e.g., currently snowing in a particular area), future forecasts (e.g., expected to snow two inches from 3:00-4:00 p.m.), historical weather, etc. The traffic data 285 describes traffic conditions. For example, the traffic data 285 may include locations of traffic jams, slower traffic, construction zones, speed traps, etc.

The driver habits data 287 may include a list of vehicle operations performed by a user, a number of times the user performed the vehicle operations, and a sequence associated with the user's performance of vehicle operations. In some implementations, the driver habits data 287 includes a threshold value that represents a number of times the user has to perform vehicle operations in a sequence before the task tracker 191 generates a vehicle task for the digitally stored dataset with the associated vehicle operations. For example, the task tracker 191 may determine that the threshold value is four and that the task tracker 191 generates the vehicle task for the digitally stored dataset if the user calls a number four or more times after the user receives an update for driving directions.

The display 229 can include hardware for displaying graphical data from the task tracker 191. For example, the display 229 renders graphics for displaying a user interface that allows the user to specify a level of autocomplete. The display 229 is coupled to the bus 220 via 230.

The microphone 231 can include hardware for recording audio inside the vehicle. For example, the microphone 231 records audio spoken by a user in response to the task tracker 191 autocompleting a vehicle operation. The microphone 231 transmits the audio to the task tracker 191 to convert the audio to words to generate a familiarity estimate that indicates whether the user is familiar with the vehicle operation. The microphone 231 is coupled to the bus 220 via signal line 232.

The speaker 233 can include hardware for generating audio for playback. For example, the speaker 233 receives instructions from the task tracker 191 to generate audio explaining a vehicle operation if the familiarity estimate fails to exceed a threshold value. The speaker 233 converts the instructions to audio and generates the audio for the user. The speaker 233 is coupled to the bus 220 via signal line 234.

The sensors 235 can include devices that provide sensor data about a vehicle operation or a user reaction. The sensors 235 may include in-vehicle sensors that can monitor and track the initiation or completion of different vehicle operations. The sensors 235 may be communicatively coupled to an onboard computer of a vehicle. The sensors 235 may include an infrared detector, a motion detector, a thermostat, etc. For example, the client device 103 may include sensors for measuring one or more of a current time, a location (e.g., a latitude, longitude, and altitude of a location), an acceleration of a vehicle, a velocity of a vehicle, a fuel tank level of a vehicle, a battery level of a vehicle, etc. The sensors 235 is coupled to the bus 220 via signal line 236.

Alternatively or additionally, the sensors 235 can include a component or module of another system or device (e.g., radio, infotainment system, thermostat) that reports a status of the system or device to the task tracker device 200. In some implementations, the sensors 235 include hardware for performing location detection, for example, a global positioning system (GPS), location detection through triangulation via a wireless network, etc.

The sensors 235 provide information about at least one of a temperature inside the vehicle, a temperature outside the vehicle, a position of the seats, a radio station, an audio program, a window level, a level of illumination of car lights, a speed of windshield wipers, and other parameters or settings associated with the vehicle and/or any system, subsystem, or device included in or communicatively coupled to the vehicle.

The sensors 235 may include an in-vehicle camera for recording the user. The in-vehicle camera records the user's face and, in particular, the user's eyes. The in-vehicle camera transmits the recording to the task tracker 191. In some embodiments where multiple in-vehicle cameras are used, the in-vehicle cameras may be positioned to capture different angles of the user's face.

The communication unit 237 can include hardware that transmits and receives data to and from the client device 103. The communication unit 237 is coupled to the bus 220 via signal line 238. In some implementations, the communication unit 237 includes a port for direct physical connection to the network 105 or to another communication channel. For example, the communication unit 237 includes a USB, SD, CAT-5, or similar port for wired communication with the client device 103. In some implementations, the communication unit 237 includes a wireless transceiver for exchanging data with the client device 103 or other communication channels using one or more wireless communication methods, including IEEE 802.11, IEEE 802.16, Bluetooth®, or another suitable wireless communication method.

In some implementations, the communication unit 237 includes a cellular communications transceiver for sending and receiving data over a cellular communications network including via short messaging service (SMS), multimedia messaging service (MMS), hypertext transfer protocol (HTTP), direct data connection, WAP, e-mail, or another suitable type of electronic communication. In some implementations, the communication unit 237 includes a wired port and a wireless transceiver. The communication unit 237 also provides other conventional connections to the network 105 for distribution of files or median objects using standard network protocols including TCP/IP, HTTP, HTTPS, and SMTP, etc.

In some implementations, the task tracker 191 includes a communication module 202. The communication module 202 can include code and routines for handling communications between the task tracker 191 and other components of the task tracker device 200. In some implementations, the communication module 202 can include a set of instructions executable by the processor 225 to provide the functionality described below for handling communications between the task tracker 191 and other components of the task tracker device 200. For example, the communication module 202 may receive images of the user from the sensor 235. In some implementations, the communication module 202 can be stored in the memory 227 of the task tracker device 200 and can be accessible and executable by the processor 225.

The communication module 202 sends and receives data, via the communication unit 237, to and from one or more of the client device 103, the weather data server 151, the social network server 155, and the traffic data server 175. For example, the communication module 202 receives, via the communication unit 237, weather data from the weather data server 151. The communication module 202 sends the weather data to the task tracker 191 for determining a vehicle task based on the weather data. The communication module 202 is coupled to the bus 220 via signal line 222.

In some implementations, the communication module 202 receives data from components of the task tracker device 200 and stores the data in the memory 227. For example, the communication module 202 receives vehicle operations performed by a user and stores the vehicle operations as driver habits data 287 in the memory 227.

The task tracker 191 may monitor the sensors 235 for sensor data and determine an occurrence of an initial vehicle operation performed by a user based on the sensor data. The task tracker 191 may determine a vehicle task from a digitally stored table based on the initial vehicle operation performed by the user. The task tracker 191 may determine a next vehicle operation to autocomplete based on the vehicle task. The task tracker 191 may autocomplete the next vehicle operation, for example, by instructing hardware associated with the client device 103 to perform the next vehicle operation. The task tracker 191 may determine whether the vehicle task is complete, and responsive to the vehicle task failing to be complete, determine an additional vehicle operation to autocomplete based on the vehicle task, autocomplete the additional vehicle operation, and repeat until the vehicle task is complete.

The learner module 295 may generate the digitally stored dataset by monitoring a sequence of vehicle operations performed by a user to complete a vehicle task and generate the digitally stored dataset by adding the vehicle task with the sequence of vehicle operations performed by the user. In some implementations, the learner module 295 uses driver habits data 287 from the memory 227 to determine whether the sequence of vehicle operations performed by the user has been performed enough times to justify creating the vehicle task. For example, the user may turn on the headlights, set the stereo to play a podcast, and make a telephone call once but not repeat the same sequence of vehicle operations again. As a result, the task tracker 191 would not generate a vehicle task that includes those operations because it may be an unusual situation.

Example User Interface

Figure 3:
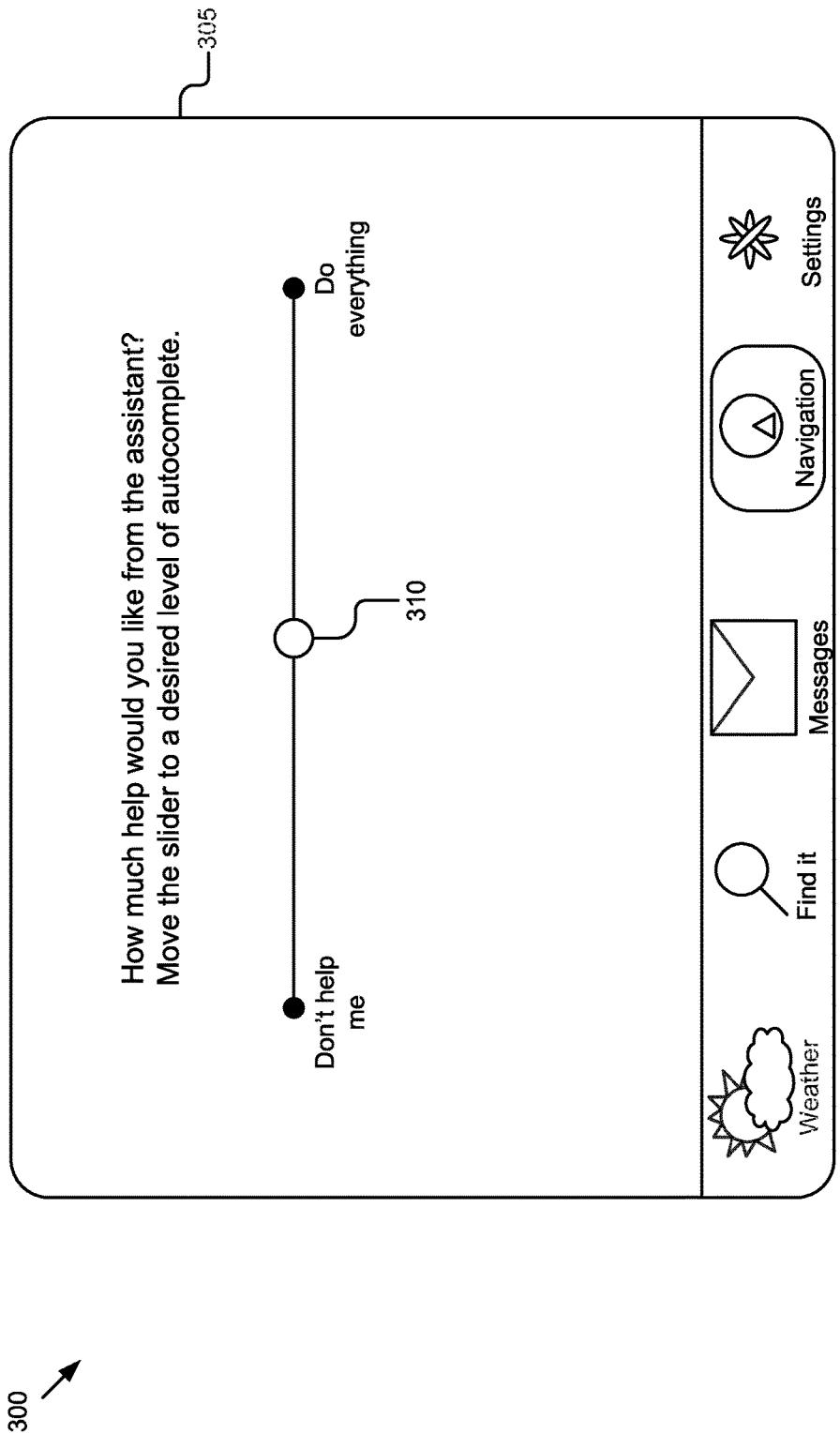
FIG. 3 is a graphic representation of an example user interface for specifying a level of autocomplete.

FIG. 3 is a graphic representation 300 of an example user interface 305 for specifying a level of autocomplete. In this example, the user interface may be displayed on a display 229 that is part of the client device 103 of FIG. 1. For example, the user interface may be displayed as an in-dash display. The user interface may be modified for other displays. For example, the user interface may be displayed on a mobile device that is used while the driver is in the car or on a desktop computer where the user may configure the settings for the task tracker 191.

The user interface 305 includes a sliding button 310 for selecting a level of autocomplete. In this example, the level of autocomplete ranges from all vehicle operations being performed manually by the user (as indicated by the "Don't help me" instruction on the left of the slider) to all vehicle operations being autocompleted by the task tracker 191 (as indicated by the "Do everything" instruction on the right side of the slider).

Example Method

Figure 4:
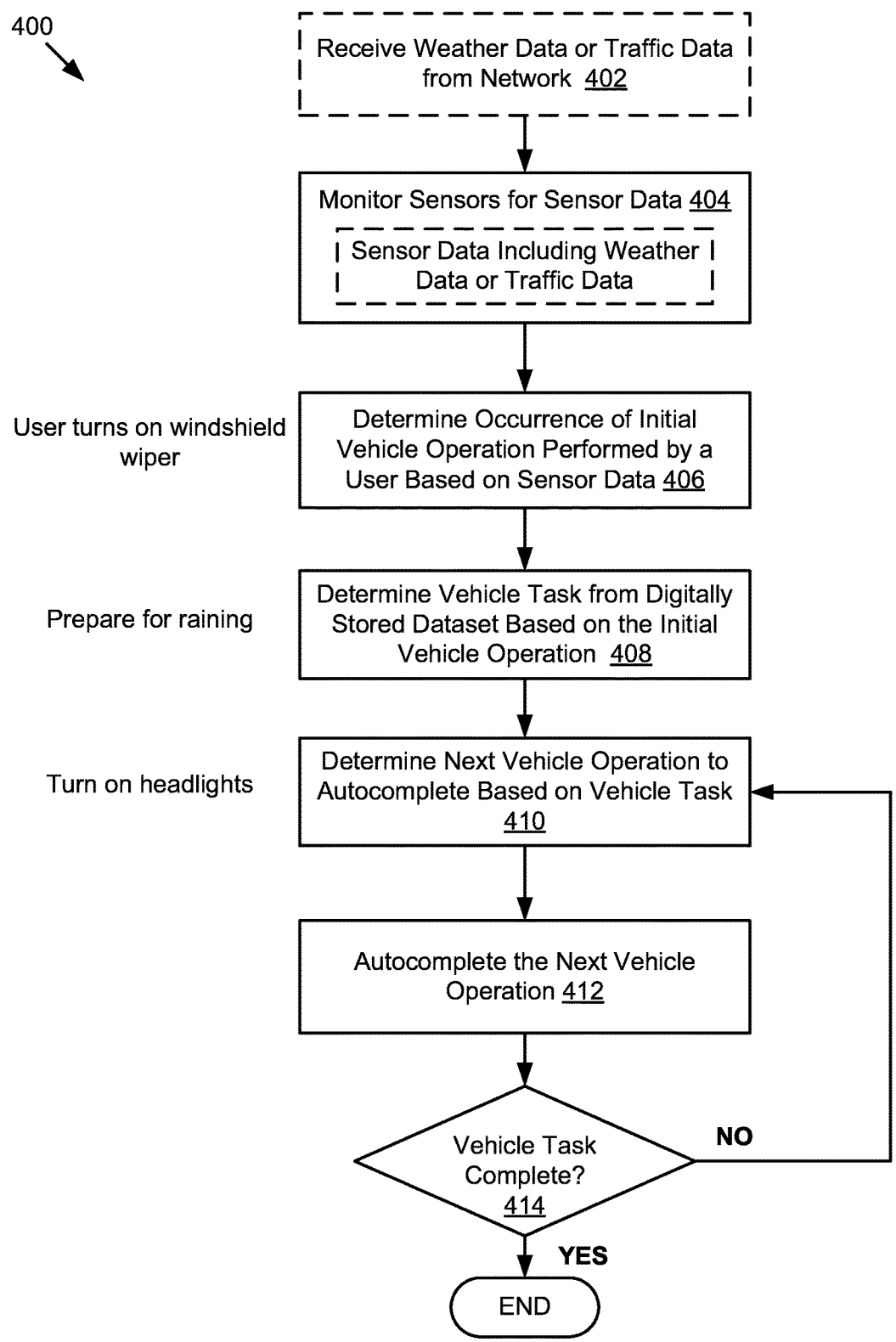
FIG. 4 is a flowchart of an example method for proactively autocompleting the user's in-vehicle operation.

FIG. 4 is a flowchart of an example method for proactively autocompleting the user's in-vehicle operation. The method 400, in some implementations, may be performed, in whole or in part, by an application such as the task tracker 191 of FIGS. 1 and 2 and/or the task tracker device 200 of FIG. 2. For instance, the task tracker 191 of FIG. 1 or 2 may be programmed to execute computer instructions stored on the memory 227 to perform functions and operations as represented by one or more of the blocks of the method 400 of FIG. 4. Although illustrated as discrete blocks, various blocks may be divided into additional blocks, combined into fewer blocks, or eliminated, depending on the desired implementation.

At block 402, weather data or traffic data may be received from a network. For example, the weather data server 151 of FIG. 1 may provide the weather data over the network 105 or the traffic data server 175 of FIG. 1 may provide the traffic data over the network 105. The weather data or the traffic data may include information that affects a user of a client device 103 of FIG. 1. For example, the weather data or the traffic data may include information that would result in a delay if the user continued driving along a particular route.

At block 404, sensor data is monitored by sensors. The sensors 235 of FIG. 2 may monitor for sensor data. The sensor data may include an action by the user as determined by capturing images of the user or as determined from in-vehicle sensors 235 that determine the vehicle operation performed by the user. The sensor data may also include sensors that detect an environmental condition, such as rain, or updates from the network 105, such as weather data, traffic data, or social network data.

At block 406, an occurrence of an initial vehicle operation performed by a user may be determined based on sensor data. For example, the task tracker 191 may determine the occurrence of the initial vehicle operation performed by the user based on the sensor data. The initial vehicle operation may include, for example, the user turning on the windshield wipers.

At block 408, a vehicle task may be determined from a digitally stored dataset based on the initial vehicle operation. For example, the task tracker 191 may determine the vehicle task from the digitally stored dataset 281 in the memory 227 of FIG. 2. The vehicle task may include, for example, preparing the client device 103 for rain. The digitally stored dataset may include a digitally stored table that includes a series of vehicle operations to be autocompleted.

At block 410, a next vehicle operation to autocomplete may be determined based on the vehicle task. For example, the task tracker 191 may determine the next vehicle operation to autocomplete based on the vehicle task. Continuing with the example above, where the vehicle task is preparing the client device 103 for rain, the next vehicle task may be to turn on the headlights of the client device 103.

At block 412, the next vehicle operation 412 is autocompleted. For example, the task tracker 191 may instruct hardware associated with the client device 103 to autocomplete the next vehicle operation.

At block 414, the method 400 may determine whether the vehicle task is complete. For example, the task tracker 191 may determine whether the vehicle task is complete by determining whether additional vehicle operations are associated with the vehicle task. If the vehicle task is not complete, the method 400 proceeds to step 410 and continues performing steps 410, 412, and 414 until the vehicle task is complete. If the vehicle task is complete, the method 400 ends.

The descriptions of the specification can also relate to an apparatus for performing the operations herein. This apparatus may include the user of a special-purpose or general-purpose computer including various computer hardware or software modules. Implementations described herein may be implemented using a computer program stored in the computer. Such a computer program may be stored in a non-transitory computer-readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory, or any type of media suitable for storing electronic instructions, each coupled to a computer system bus.

The specification can take the form of some entirely hardware implementations, some entirely software implementations, or some implementations containing both hardware and software elements. In some implementations, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited to, keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the implementations of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies, and other aspects are not mandatory or significant, and the mechanisms that implement the specification or its features may have different names, divisions, or formats. Furthermore, the modules, routines, features, attributes, methodologies, and other aspects of the disclosure can be implemented as software, hardware, firmware, or any combination of the three. Also, wherever a component, an example of which is a module, of the specification is implemented as software, the component can be implemented as a standalone program, as part of a larger program, as a plurality of separate programs, as a statically or dynamically linked library, as a kernel-loadable module, as a device driver, or in every and any other way known now or in the future to those that practice the art of computer programming. Additionally, the disclosure is in no way limited to implementations in any specific programming language, or for any specific operating system or environment. Accordingly, the disclosure is intended to be illustrative, but not limiting, of the scope of the specification, which is set forth in the following claims.

What is claimed is:

1. A method for autocompleting an in-vehicle operation, the method comprising:
monitoring in-vehicle sensors for sensor data;
determining, by an onboard computer of a vehicle, an occurrence of an initial vehicle operation performed by a user based on the sensor data;
determining a confidence factor that indicates a likelihood that the initial vehicle operation performed by the user was accurately determined based on one or more images received from one or more of the in-vehicle sensors;
determining, by the onboard computer of the vehicle, a vehicle task from a digitally stored dataset based on the confidence factor exceeding a threshold value and the initial vehicle operation, the vehicle task including the initial vehicle operation and a next vehicle operation;
determining, by the onboard computer of the vehicle, the next vehicle operation to autocomplete based on the vehicle task;
autocompleting the next vehicle operation;
determining, by the onboard computer of the vehicle, whether the vehicle task is complete;
determining, by the onboard computer of the vehicle, the occurrence of a subsequent vehicle operation performed by the user in response to autocompleting the vehicle task; and
responsive to the user performing the subsequent vehicle operation a threshold number of times, updating the digitally stored dataset by adding the subsequent vehicle operation to the vehicle task as a first additional vehicle operation to be autocompleted, wherein the threshold number of times is a positive whole number.

2. The method of claim 1, further comprising responsive to the vehicle task failing to be complete, determining a second additional vehicle operation to autocomplete based on the vehicle task, autocompleting the second additional vehicle operation, and repeating until the vehicle task is complete.

3. The method of claim 1, wherein the next vehicle operation includes automatically calling a person listed in an address book associated with the user.

4. The method of claim 1, wherein determining the next vehicle operation is also based on the confidence factor exceeding a threshold value.

5. The method of claim 1, further comprising:
responsive to autocompleting the next vehicle operation, monitoring the in-vehicle sensors to identify one or more words spoken by the user; and
providing the user with an explanation of the next vehicle operation based on the one or more words spoken by the user.

6. The method of claim 1, further comprising:
receiving traffic data from a network, the traffic data including information that would result in a delay if the user continued driving along a particular route; and
determining a next vehicle task based on the traffic data.

7. The method of claim 1, wherein the in-vehicle sensors detect a weather condition and the vehicle task is based on the weather condition.

8. The method of claim 1, further comprising:
determining driver habits of the user based on a list of vehicle operations performed by the user and a number of times vehicle operations in the list of vehicle operations were performed; and
responsive to the number of times exceeding a threshold value, generating the vehicle task; and
storing the vehicle task as the digitally stored dataset.

9. The method of claim 1, wherein the digitally stored dataset is a digitally stored table that includes a list of the in-vehicle sensors to be monitored for determining the vehicle task.

10. The method of claim 1, further comprising:
responsive to autocompleting the next vehicle operation, monitoring the in-vehicle sensors for sensor data that includes one or more images and one or more sounds of the user; and
responsive to at least one of the one or more images including the user frowning and the one or more sounds including a word that indicates confusion, generating an explanation of the next vehicle operation for the user.

11. The method of claim 10, wherein the word that indicates confusion corresponds to a list, where the list includes words that each have a particular meaning.

12. The method of claim 1, further comprising:
monitoring a sequence of vehicle operations performed by the user to complete the vehicle task; and
generating the digitally stored dataset by adding the vehicle task with the sequence of vehicle operations performed by the user.

13. The method of claim 1, further comprising:
generating a user interface that includes graphical elements for selecting a level of autocomplete; and
responsive to the user selecting the level of autocomplete, updating the digitally stored dataset to include the level of autocomplete.

14. A non-transitory computer-readable medium having computer instructions stored thereon that are executable by an onboard computer of a vehicle to perform or control performance of steps comprising:
monitoring in-vehicle sensors for sensor data;
determining, by the onboard computer of the vehicle, an occurrence of an initial vehicle operation performed by a user based on the sensor data;
determining a confidence factor that indicates a likelihood that the initial vehicle operation performed by the user was accurately determined based on one or more images received from one or more of the in-vehicle sensors;
determining, by the onboard computer of the vehicle, a vehicle task from a digitally stored dataset based on the confidence factor exceeding a threshold value and the initial vehicle operation, the vehicle task including the initial vehicle operation and a next vehicle operation;
determining, by the onboard computer of the vehicle, the next vehicle operation to autocomplete based on the vehicle task;
autocompleting the next vehicle operation;
determining, by the onboard computer of the vehicle, whether the vehicle task is complete;
determining, by the onboard computer of the vehicle, the occurrence of a subsequent vehicle operation performed by the user in response to autocompleting the vehicle task; and
responsive to the user performing the subsequent vehicle operation a threshold number of times, updating the digitally stored dataset by adding the subsequent vehicle operation to the vehicle task as a first additional vehicle operation to be autocompleted.

15. The non-transitory computer-readable medium of claim 14, the steps further comprising responsive to the vehicle task failing to be complete, determining a second additional vehicle operation to autocomplete based on the vehicle task, autocompleting the second additional vehicle operation, and repeating until the vehicle task is complete.

16. The non-transitory computer-readable medium of claim 14, wherein determining the next vehicle operation is also based on the confidence factor exceeding a threshold value.

17. The non-transitory computer-readable medium of claim 14, the steps further comprising:
responsive to autocompleting the next vehicle operation, monitoring the in-vehicle sensors to identify one or more words spoken by the user; and
providing the user with an explanation of the next vehicle operation based on the one or more words spoken by the user.

18. The non-transitory computer-readable medium of claim 14, the steps further comprising:
receiving weather data from a network, the weather data including roadway weather conditions; and
determining a next vehicle task based on the weather data.

19. The non-transitory computer-readable medium of claim 14, wherein the in-vehicle sensors detect a weather condition and the vehicle task is based on the weather condition.

20. The non-transitory computer-readable medium of claim 14, the steps further comprising:
determining driver habits of the user based on a list of vehicle operations performed by the user and a number of times vehicle operations in the list of vehicle operations were performed; and
responsive to the number of times exceeding a threshold value, generating the vehicle task; and
storing the vehicle task as the digitally stored dataset.

21. A method for autocompleting an in-vehicle operation, the method comprising:
monitoring sensors for first sensor data;
determining, by an onboard computer of a vehicle, an occurrence of an initial vehicle operation performed by a user based on the first sensor data;
determining a confidence factor that indicates a likelihood that the initial vehicle operation performed by the user was accurately determined based on images received from one or more of the in-vehicle sensors;
determining, by the onboard computer of the vehicle, a vehicle task from a digitally stored table based on the confidence factor exceeding a threshold value and the initial vehicle operation performed by the user, the vehicle task including the initial vehicle operation and a next vehicle operation;
determining, by the onboard computer of the vehicle, the next vehicle operation to autocomplete based on the vehicle task;
autocompleting the next vehicle operation;
determining, by the onboard computer of the vehicle, whether the vehicle task is complete;
responsive to the vehicle task failing to be complete, determining, by the onboard computer of the vehicle, an additional vehicle operation to autocomplete based on the vehicle task, autocompleting the additional vehicle operation, and repeating until the vehicle task is complete;
monitoring the sensors for second sensor data that includes one or more images and one or more sounds of the user; and
responsive to determining that the one or more sounds of the user include a word that indicates confusion, generating an explanation of the next vehicle operation.

* * * * *